United States Patent

Bacardit

[11] Patent Number: 5,127,311
[45] Date of Patent: Jul. 7, 1992

[54] HYDRAULIC SYSTEM FOR A SERVO STEERING OF A MOTOR VEHICLE

[75] Inventor: Joan S. Bacardit, Barcelona, Spain
[73] Assignee: Bendix Espana, Barcelona, Spain
[21] Appl. No.: 650,107
[22] Filed: Feb. 4, 1991

[30] Foreign Application Priority Data

Feb. 23, 1990 [ES] Spain ............................ 9000537

[51] Int. Cl.$^5$ .................... F15B 9/10; B62D 5/06
[52] U.S. Cl. .................... 91/370; 60/384; 60/393; 180/143
[58] Field of Search .............. 60/384, 386, 393; 91/370, 434; 180/132, 141, 142, 143

[56] References Cited

U.S. PATENT DOCUMENTS

| | | | |
|---|---|---|---|
| 4,044,786 | 8/1977 | Yip | 180/132 |
| 4,372,413 | 2/1983 | Petgrsen et al. | 180/132 |
| 4,665,797 | 5/1987 | Bacardit | 91/370 |
| 4,665,798 | 5/1987 | Bacardit | 180/132 |
| 4,712,632 | 12/1987 | Kervagoret | 180/143 |
| 4,768,605 | 9/1988 | Miller et al. | 180/143 |
| 4,775,022 | 10/1988 | Hirakushi et al. | 91/434 |

FOREIGN PATENT DOCUMENTS 3109851 10/1982 Fed. Rep. of Germany .

Primary Examiner—Edward K. Look
Assistant Examiner—Hoang Nguyen
Attorney, Agent, or Firm—Larry J. Palguta; Ken C. Decker

[57] ABSTRACT

The hydraulic system for a servo steering of a motor vehicle, incorporates a main valve mechanism producing the assistance pressure (Pa) applied to a hydraulic assistance device (12) and including a pair of parallel fluid circuits between a source (14) of pressurized fluid and a reservoir (16), each fluid circuit comprising at least two restrictions (1,2,1',2') capable of being modulated by a rotor mechanism (10) cooperating with a stator mechanism (11), the junction point of the restrictions of each circuit being connected to a respective chamber of the hydraulic assistance device (12) and a secondary valve mechanism producing the reaction pressure (Pr) applied to the steering wheel shaft and including a second pair of parallel fluid circuits between a source (24) of pressurized fluid and a reservoir (16), each of the fluid circuits comprising at least two restrictions (3,4,3',4') capable of being modulated by the rotor mechanism (10) cooperating with stator means, the rotor mechanism (11) cooperating with the steering wheel shaft, the source (14) of pressurized fluid of the main valve mechanism supplies a fixed flow of fluid and the source (24) of pressurized fluid of the secondary valve mechanism supplies a variable flow of fluid thanks to a pump driven as a function of the vehicle speed.

4 Claims, 1 Drawing Sheet

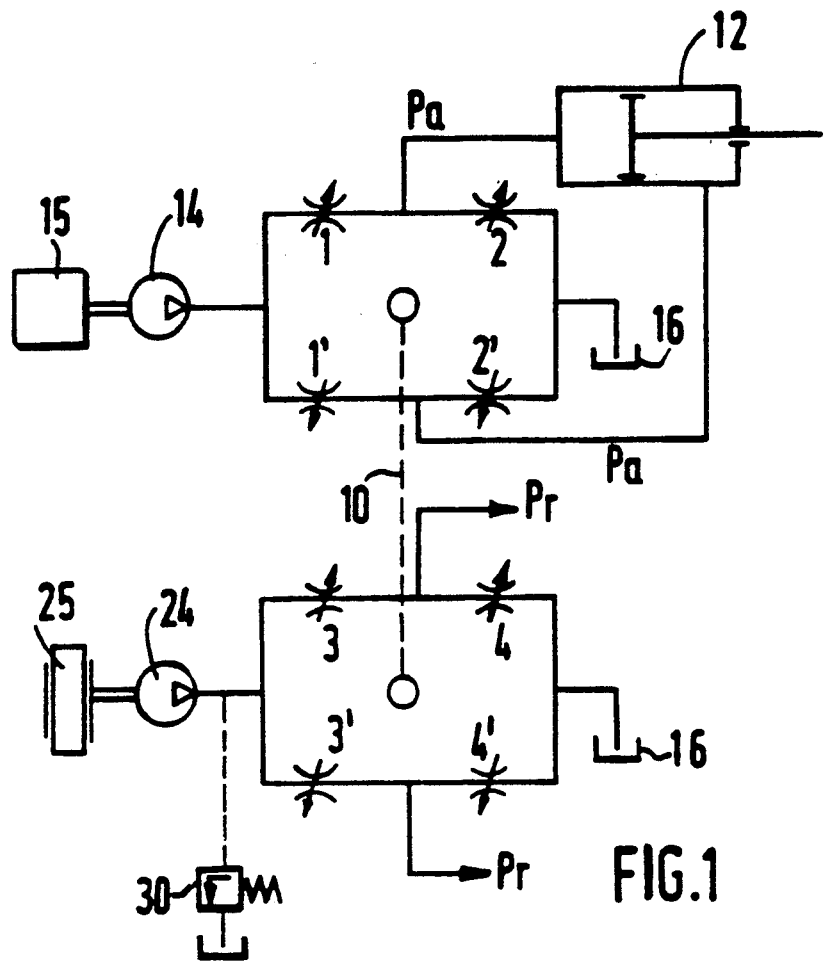
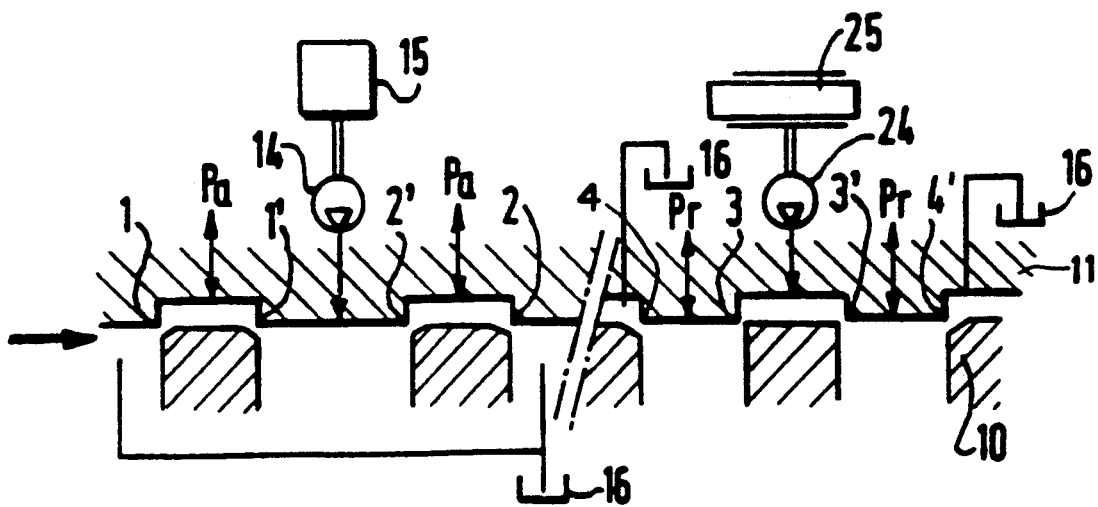

HYDRAULIC SYSTEM FOR A SERVO STEERING OF A MOTOR VEHICLE

BACKGROUND OF THE INVENTION

The present invention relates to a hydraulic system for a servo steering of a motor vehicle, incorporating:
a main valve means producing the assistance pressure applied to a hydraulic assistance device, and including a pair of parallel fluid circuits between a source of pressurized fluid and a reservoir, each fluid circuit comprising at least two restrictions capable of being modulated by rotor means cooperating with stator means, the junction point of the restrictions of each circuit being connected to a respective chamber of the hydraulic assistance device;
a secondary valve means producing the reaction pressure applied to the steering wheel shaft and including a second pair of parallel fluid circuits between a source of pressurized fluid and a reservoir, each of the fluid circuits comprising at least two restrictions capable of being modulated by rotor means cooperating with stator means, rotor means cooperating with the steering wheel shaft.

Such a hydraulic system is known in the art from U.S. Pat. Nos. 4,594,936 and 4,665,798. However, the distributor disclosed in these documents includes an external variable restriction piloted by an on-board computer in order to modify the reaction pressure applied to the steering wheel shaft as a function of the vehicle speed.

This on-board computer and this additional variable restriction are costly, and a cheaper power steering system having a reaction pressure variable with the speed of the vehicle is highly desirable.

SUMMARY OF THE INVENTION

It is an object of the invention to provide a new hydraulic system which is of cheaper design.

This object and others are achieved by using two different sources of pressurized fluid, the first one of which supplies a fixed flow of fluid to the main valve means for producing the assistance pressure, and the second one of which supplies a variable flow of fluid to the secondary valve means for producing a reaction pressure applied to the steering wheel shaft. Accordingly, the first source is a pump operated either at constant speed or at variable speed with a flow regulator connected in series and the second source is a pump driven as a function of the vehicle speed.

From DE3 109 851 is known to use two pumps of these types, but the pump driven off the wheels is only used in case of failure of the other pump in order to provide a sufficient servo force to bring the vehicle safely to a controlled stopping place.

BRIEF DESCRIPTION OF THE DRAWINGS

The invention will now be described by way of an example with reference to the accompanying drawings, in which:

FIG. 1 diagrammatically shows a hydraulic system according to the invention, and FIG. 2 is a diagrammatically developed view of a section of a distributor which may be used for reducing to practice the system illustrated FIG. 1.

DETAILED DESCRIPTION OF THE INVENTION

With reference now to FIGS. 1 and 2, the distributor includes two parallel parts controlled by a rotor means 10 cooperating with a stator 11 (see FIG. 2) and controlled by the steering wheel shaft of the vehicle. A first part provides the assistance pressure Pa to an assistance actuator 12. This first part includes a pump 14 driven at constant speed by an electrical motor 15 connected to the vehicle battery. However it can also be operated at variable speed by the engine with a flow regulator connected in series. Two circuits for the pressurized fluid are connected in parallel between the output of the pump 14 and a reservoir 16.

Each one comprises in series two variable restrictions, respectively 1,2, 1',2'. The junction point of the two restrictions of each branch is connected to a respective chamber of the assistance actuator 12.

The second part of the distributor provides the reaction pressure Pr to the steering wheel shaft. This second part includes a pump 24 driven as a function of the speed of the vehicle, e.g. this pump is coupled with a wheel 25 of the vehicle. Two circuits of pressurized fluid are connected in parallel between the output of the pump 24 and a reservoir 16. Each one comprises in series two variable restrictions, respectively 3,4, 3',4'. The junction point of the two restrictions of each branch is connected to a reaction actuator (not shown).

Preferably, a relief valve 30 is provided in the second part of the distributor in order to limit the reaction pressure.

All the above mentionned restrictions of the distributor are capable of being modulated by the rotor means 10 cooperating with the stator 11 and controlled by the steering wheel shaft.

In operation, when the car wheels are in straight position, restrictions of the first and second parts are open and the pressurized fluid flows directly to the reservoir 16. If the car is stopped or at low speed, no or few pressurized fluid flows through the second part directly to the reservoir 16.

When the driver turns the steering wheel, the distributor is correspondly actuated. In the first part, restrictions 1 and 2' for instance are closed and the pressurized fluid flows to one of the chambers of the assistance actuator 12, and unpressurized fluid flows from the other chamber of the actuator 12 to the reservoir 16 which is then in communication. The steering mechanism receives consequently an assistance. In the same time, in the second part generating the reaction pressure, two restrictions 3,4' for instance are also closed in order to provide the pressurized fluid delivered by the pump 24 to only one outlet, the other outlet being then in communication with the reservoir 16. The reaction pressure is then depending on the pressure of the fluid delivered by the pump 24, i.e. the reaction pressure is high if the vehicle speed is high, low if the speed is low, and null if the vehicle is stopped. Obviously, elastic means are provided in the steering wheel shaft in order to ensure the return to the rest position of the distributor when no more assistance is required.

In FIG. 2 is illustrated such a distributor of the star-shaped type in a developed diagrammatic view.

The skilled man will understand the operation of this distributor without further comments.

While it has been described and shown a preferred embodiment of the invention, the skilled man may bring various modifications without departing from the scope of the invention as defined by the annexed claims.

What is claimed is:

1. A hydraulic system for a servo steering of a motor vehicle, incorporating:

main valve means producing an assistance pressure applied to a hydraulic assistance device and including a pair of parallel fluid circuits between a source of pressurized fluid and a reservoir, each said fluid circuit comprising at least two restrictions capable of being modulated by rotor means cooperating with stator means, a junction point of said restrictions of each circuit being connected to a respective chamber of the hydraulic assistance device;

secondary valve means producing a modulated reaction pressure applied to a steering wheel shaft and including a second pair of parallel fluid circuits between a source of pressurized fluid and a reservoir, each of said second pair of fluid circuits comprising at least two restrictions capable of being modulated by said rotor means cooperating with the stator means, said rotor means controlled by the steering wheel shaft, wherein the source of pressurized fluid of said main valve means supplies a fixed flow of fluid and the source of pressurized fluid of said secondary valve means supplies, due to a pump driven as a function of the vehicle speed, a variable flow of fluid producing a direct proportional reaction pressure applied to the steering wheel shaft and variable directly proportionally as a function of the vehicle speed.

2. The hydraulic system according to claim 1, wherein a relief valve is connected to the source of pressurized fluid providing variable fluid flow in order to limit the reaction pressure.

3. The hydraulic system according to claim 1, wherein the source of pressurized fluid of said main valve means is a pump operated at a constant speed.

4. The hydraulic system according to claim 1, wherein the source of pressurized fluid of said main valve mans is a pump operated at a constant speed with a flow regulator connected in series.

* * * * *